Figure 1:
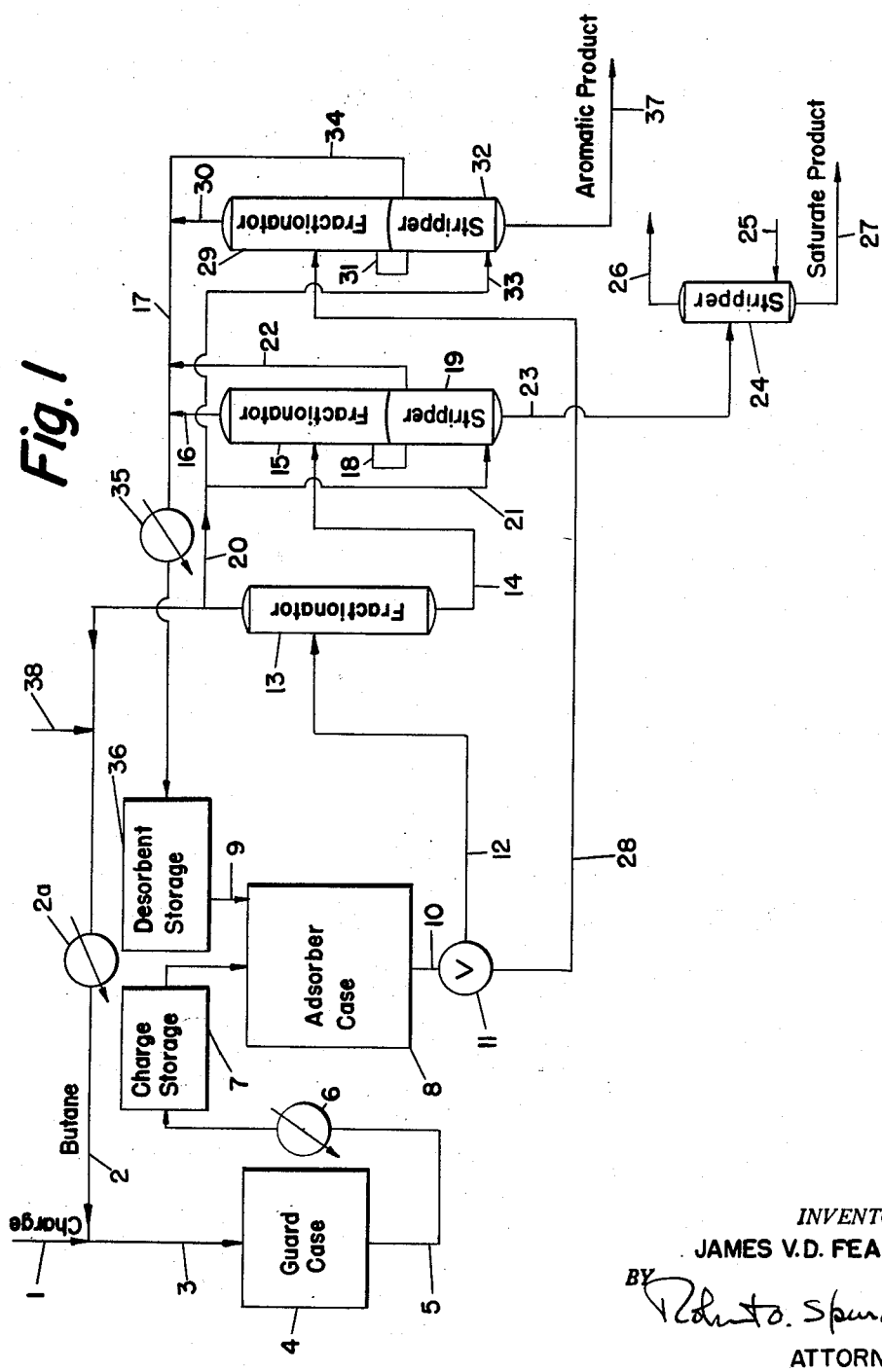

Aug. 12, 1958     J. VAN DYCK FEAR     2,847,485
RECOVERY OF DESORBENT COMPONENTS
Filed Aug. 31, 1955     2 Sheets-Sheet 1

INVENTOR.
JAMES V.D. FEAR
ATTORNEY

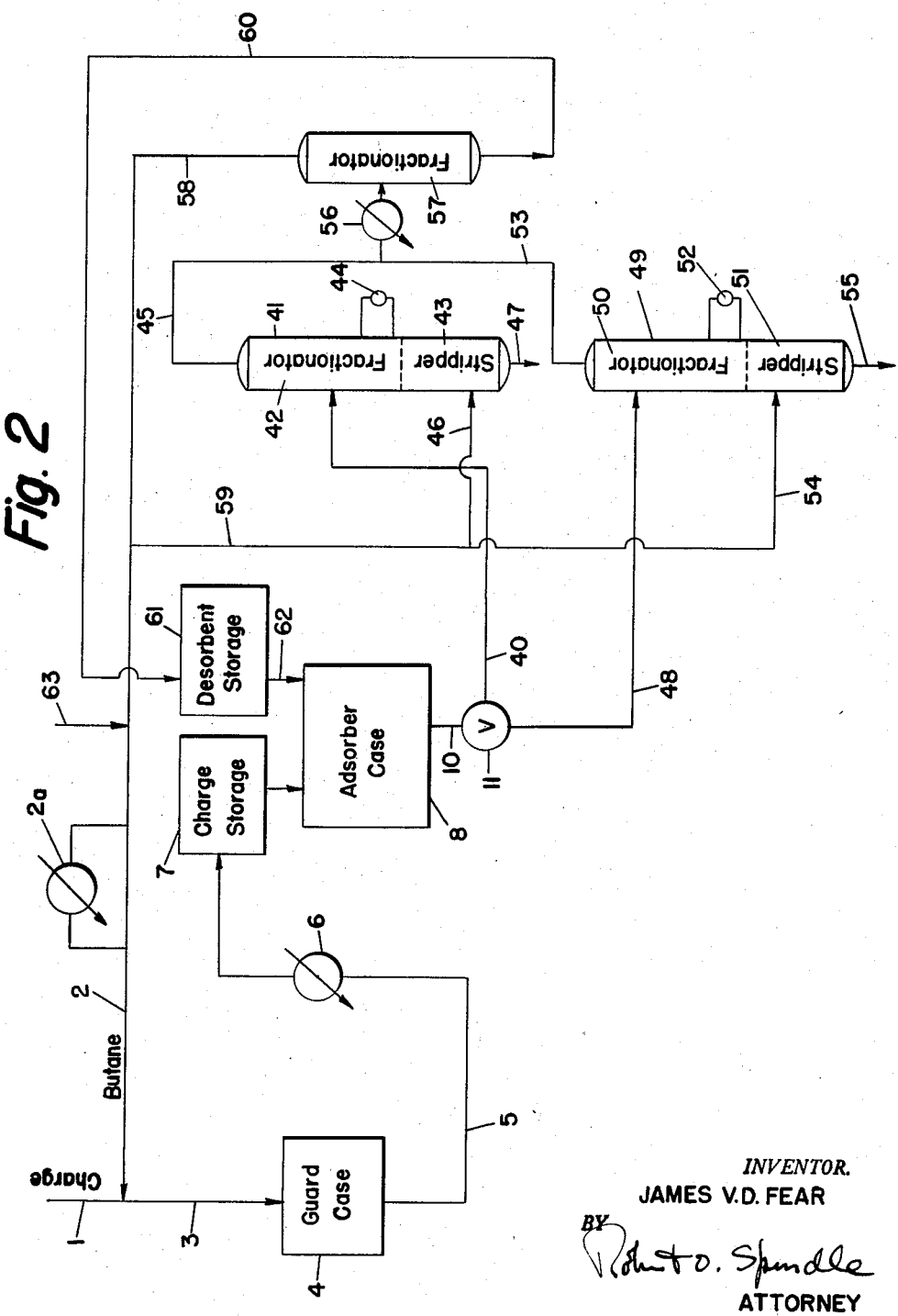

United States Patent Office 2,847,485
Patented Aug. 12, 1958

2,847,485

RECOVERY OF DESORBENT COMPONENTS

James Van Dyck Fear, Upper Providence, Pa., assignor to Sun Oil Company, Philadelphia, Pa., a corporation of New Jersey Application August 31, 1955, Serial No. 531,773

3 Claims. (Cl. 260—674)

This invention relates to an adsorption process for the removal of aromatics from higher boiling petroleum stock, and more particularly to a method of recovery of minor amounts of desorbent from the aromatic and saturate fractions obtained by adsorptive processing of petroleum stocks of lubricating viscosity.

Cyclic processes for separating a petroleum charge stock into fractions of different chemical constitution by means of preferential adsorption on an adsorbent such as silica gel, activated carbon, and the like, are well known to the art, such as the "Arosorb" process described on pages 109–113 of Petroleum Refiner, vol. 31, No. 5 (May 1952 issue). In such processes, during each cycle, charge stock comprising both saturates and aromatics is passed through a bed of adsorbent until the capacity of the bed to adsorb charge aromatics is nearly exhausted, after which a sufficient quantity of desorbent to completely desorb the charge aromatics is passed though the bed. The desorbent, which may comprise a component of low adsorbability together with a component of high adsorbability, is so selected that its boiling range is sufficiently outside of the boiling range of the charge stock to enable easy separation of charge and desorbent components by fractional distillation.

The effluent from the adsorbent case, during each cycle of operation, is collected in two or more portions, one of which comprises charge saturates and desorbent, and another of which comprises charge aromatics and desorbent. These portions are then separately subjected to fractional distillation in order to recover a charge saturate fraction, a charge aromatics fraction, and desorbent for recycle to the process.

When the charge stock is a higher boiling fraction, particularly a fraction of lubricating viscosity, the charge saturate and aromatic fractions so recovered will contain minor amounts, in the order of one or two percent, of desorbent, even when the bottoms temperature in the still is as high as 400° F. Higher temperatures sufficient to completely vaporize the bottoms cannot be used in atmospheric pressure distillations, since at such higher temperatures there is a danger of cracking the oil. While complete separation of desorbent from the charge saturate and aromatic fractions could probably be obtained by distillation under a sufficiently high vacuum, the cost of vacuum distillation would impose a severe economic penalty on the process. Retention of desorbent components in the charge fractions presents a double problem, since not only is valuable desorbent removed from the system, requiring replacement thereof, but the flash point of the finished lubricating oil product may be lowered to a point at which the oil will not meet specifications, and the presence of some desorbent components, such as ethylene dichloride, in the charge aromatics, which are usually used as feed to a cracking process, would unfit the aromatics for such use. While efforts have heretofore been made to recover the desorbent, as by steam stripping, flue gas stripping, or vacuum stripping with low temperature condensation of the overhead, such methods have not proven economically attractive. Steam stripping involves generation of steam, condensation of steam and desorbent, separation of desorbent, and drying the desorbent prior to return to the adsorption system, since water in the desorbent would act as a gel poison. Flue gas stripping requires the provision of an absorption tower, with subsequent distillation to recover desorbent from the absorber oil, while vacuum stripping requires pumps to produce the vacuum, and refrigeration for the condenser in addition to heavier overall equipment.

It is the principal object of this invention to provide an economical process for recovering from higher boiling hydrocarbon fractions produced in a cyclic adsorption process, small quantities of desorbent components contained therein.

It is a further object of this invention to recover the said desorbent components in a form in which they may be recycled directly to the process without further treatment.

A still further object is to provide means for heating a charge stock to a temperature favoring removal of gel poisons therefrom, or to the desired temperature for treatment in the main adsorbent case, without the necessity of providing heat exchangers or any heat from an outside source.

Other objects and advantages of the invention will become apparent as the disclosure proceeds.

In practice, when refining oils of lubricating viscosity by the adsorption technique, it is customary to dilute the oil, prior to processing, with a light saturate hydrocarbon such as butane or pentane, in order to reduce the viscosity to a manageable value, and to employ the same hydrocarbon as the less adsorbable component of the desorbent. For example, the charge stock may be diluted with an equal volume of butane, and the desorbent may be a butane-toluene mixture containing from 40% to 80% toluene by volume as the more adsorbable component of the desorbent. Other substances suitable for use as the more adsorbable component include benzene, xylenes, ethyl benzene, ethylene dichloride, or other compounds which are readily adsorbed on an adsorbent having the characteristics of silica gel, and which have boiling points sufficiently far from the diluent and the charge stock as to be readily separable therefrom by fractional distillation. In the ensuing description, the light saturate hydrocarbon will be referred to as "diluent," whether introduced into the process as diluent for the charge stock, or as a desorbent component.

When operating with such a charge stock and desorbent, the first portion of effluent from the adsorbent, during each cycle, will comprise charge saturates, diluent, and the more adsorbable desorbent component, while the second portion will comprise charge aromatics, diluent, and an additional quantity of the more adsorbable desorbent component. Each of these portions are then subjected to one or more fractional distillations to recover a charge saturate fraction, a charge aromatics fraction, a diluent fraction, and a desorbent fraction composed of the desired proportions of more and less adsorbable components. It has been found in practice that even when the bottoms temperature in the fractional distillations from which charge saturates and charge aromatics are recovered is as high as 400° F., the bottoms will still contain about 2% of desorbent components. In accordance with the present invention, the bottoms from these distillations are passed to a stripping zone in which they are stripped with diluent recovered from another step in the process, to remove the desorbent substantially completely. The overhead from the stripping zone consisting of diluent and the more readily adsorbed desorbent component may be recovered directly therefrom and recycled to the process as desorbent, or the overhead may pass upwardly through the distillation zone, in which case it is recovered along with the overhead products from the distillation. In any event, there will be substantially no loss of the more readily adsorbed desorbent component to the charge products. A very small amount of diluent may remain in the charge products, but this may easily be removed in subsequent processing steps, and may be recovered as such, or used as fuel in admixture with other normally gaseous hydrocarbons. Since the diluent is relatively inexpensive, and will be present in the charge fractions in a much lesser amount than the more readily adsorbed desorbent component, due to its lower boiling point, even though it were lost completely in the subsequent processing steps, no serious economic penalty would be incurred.

In order that those skilled in the art may more fully appreciate the nature of my invention and the method for carrying it out, it will be more fully described in connection with the accompanying drawings which are flow sheets of two embodiments of my invention.

As illustrated in Fig. 1 of the drawings a charge stock containing both saturates and aromatics of lubricating viscosity is introduced through line 1 and is mixed with a light saturated hydrocarbon such as butane from recycle line 2 in an amount sufficient to dilute the charge stock to the desired viscosity. Alternatively, any other light hydrocarbon, such as pentane, may be used, provided that it boils sufficiently far away from the more readily adsorbed component of the desorbent, hereinafter described, to enable it to be separated therefrom by fractional distillation. The butane may be either in liquid phase, or it may be a hot vapor as recovered from a later step in the operation. In the vent that the butane is in liquid phase, the mixture of charge and butane is then passed through a heater (not shown) in order to raise the temperature of the feed to from 175° F. to about 250° F., depending upon the viscosity of the charge stock, in order to facilitate removal of gel poisons in a guard case as described in my co-pending application, Serial No. 516,424, filed June 20, 1955, or to raise the temperature of the charge stock to the desired operating temperature, it being understood that the higher the temperature, within limits, the less diluent is required to reduce the viscosity of the charge to the required degree. If, however, the diluent is introduced in vapor phase, condensation thereof in the charge stock will usually impart some or all of the heat to raise it to the desired temperature, the quantity of heat so supplied being regulated by controlling the pressure in the still from which butane is recovered in a later step of the process, and consequently the temperature at which the butane is recovered overhead. It will be understood, of course, that the adsorption process will be operated under sufficient pressure to maintain all charge and desorbent components in liquid phase during contact thereof with the adsorbent.

The oil-butane mixture is then taken through line 3 to guard case 4, which is packed with an adsorbent material, in order to remove gel poisons, as described in the aforementioned application. The effluent from guard case 4 is taken through line 5, cooled in heat exchanger 6 to the desired operating temperature, and is passed to charge storage 7, from which it is intermittently withdrawn and passed to adsorber case 8, which is packed with an adsorbent substance such as silica gel. The diluted charge will be passed through the adsorbent until its capacity for charge aromatics has been substantially exhausted, at which time flow of charge to adsorber case 8 is shut off, and desorbent, which preferably is a mixture of butane and toluene containing from 40 to 80% toluene is introduced through line 9 to adsorber case 8. The desorbent may of course comprise any of the compounds mentioned above as more readily adsorbable components, toluene being selected in this case merely for purpose of example. Flow of desorbent is continued until the charge aromatics have been completely removed from the adsorbent to complete the cycle, after which flow of charge from storage 7 is resumed to start another cycle of operation.

During each cycle the first portion of effluent from adsorber case 8 will consist of charge saturates, butane, and toluene, together with a small amount of charge aromatics. This portion is passed through line 10, valve 11, and line 12 to a fractionator 13 from which butane is removed overhead through line 2. A condenser 2a may be interposed in line 2 in the event that it is desired to reduce the butane to liquid phase prior to mixing with the charge stock; otherwise, the condenser may be dispensed with.

The bottoms from fractionator 13 is taken through line 14 to a fractionator 15 from which a mixture of toluene and butane is taken overhead through line 16, which makes connection with desorbent manifold 17. The bottoms from fractionator 15, which consists of charge saturates together with about 2% toluene is taken through line 18 to stripper 19. A portion of uncondensed butane taken overhead from fractionator 13 is bled from line 2 and introduced to stripper 19 through lines 20 and 21, sufficient butane being introduced to completely strip the toluene from the bottoms from fractionator 15. A stream of butane and toluene is taken off stripper 19 through line 22, which also connects with desorbent manifold 17.

The bottoms from stripper 19 which now comprises charge saturates together with a very small amount of dissolved butane is removed through line 23 and may be passed to a second stripper 24 through which an ethane or methane fraction introduced through line 25 is passed in order to remove dissolved butane. Ethane together with butane removed from the charge saturates is taken off overhead through line 26 to a gas plant for recovery of the values contained in the stream, while a saturate lubricating oil fraction is removed through line 27 for further processing.

While means for removing residual butane is illustrated herein as a second stripper, it will be apparent to those skilled in the art that if the charge saturate fraction is to be further processed by vacuum distillation for the recovery of oils of varying viscosities, the butane will be recovered in the overhead from this fractionation and that no second stripper will be necessary in this case. Other processing steps may also be used to eliminate the butane, so that the flash point of the finished oil will not be adversely affected.

The second portion of effluent issuing from the adsorber case 8 during each cycle of operation will consist chiefly of charge aromatics, butane, and toluene. This fraction is removed through line 10, valve 11 and line 28 and is passed to fractionator 29 from which a mixture of butane and toluene is taken overhead through line 30, which connects with the desorbent manifold 17. The bottoms from fractionator 29, which comprises charge aromatics together with about 2% toluene is taken through line 31 and is passed to stripper 32. A second portion of uncondensed butane recovered overhead from fractionator 13 is bled from line 2 and taken through lines 20 and 33 to stripper 32, in which it serves to strip out substantially all of the toluene contained in the bottoms from fractionator 29. A stream containing butane and toluene is removed from stripper 32 through line 34, which also connects with desorbent manifold 17. The mixture of toluene and butane in manifold 17 is condensed in condenser 35 and is then passed to desorbent storage 36, from which it is intermittently passed through line 9 to adsorber case 8.

An aromatic product comprising charge aromatics together with a small amount of butane is removed from stripper 32 through line 37, and is preferentially passed to a catalytic cracker for the production of products boiling in the gasoline boiling range, the butane content of the stream being recovered in the butane fraction of the cracked gases.

It will be appreciated by those skilled in the art that means for supplying necessary heat to the various distillation towers will be supplied. Such means have not been shown in the drawing since they do not form any part of the present invention, and inclusion thereof in the drawings and description would only serve to unduly complicate the disclosure.

As may be observed from the foregoing, I have provided a process for direct recovery of desorbent aromatics from product streams in which the desorbent aromatics are recovered in condition for immediate reuse as desorbent, without any intermediate treatment thereof. It will be appreciated that conditions in fractionator 13 will be such that only enough butane will be vaporized therein to supply diluent for the charge stock, and for the stripping operations in stripper 19 and 32. By so operating the blend of desorbent recovered through lines 16, 22, 30, and 34 may be maintained at its desired composition, make-up butane to replace the small amounts removed from the system with the charge saturate and aromatic fractions being supplied through line 38. Since butane is a relatively low-cost material readily available in large quantities in any petroleum refinery, the necessity for supplying make-up butane does not impose any noticeable economic penalty on the adsorption process.

In the form of the invention illustrated in Fig. 2, fresh charge stock of lubricating viscosity is introduced through line 1, mixed with butane from recycle line 2, heated and passed through guard case 4, line 5, cooler 6, and charge storage 7 to adsorber case 8, as described in connection with Fig. 1. The adsorption operation in adsorber case 8 is also identical with that described in Fig. 1, in that diluted charge stock and desorbent are passed alternatively through the desorbent, and during each cycle of operation a first portion of effluent comprising charge saturates, butane, and toluene, and a second portion of effluent comprising charge aromatics, butane, and toluene are successively withdrawn through line 10. In the embodiment of Fig. 2, however, the subsequent processing steps are somewhat different from those of the embodiment of Fig. 1.

The first portion of effluent, comprising charge saturates, butane, and toluene, is diverted through valve 11 and line 40 to column 41, which is divided into a distillation zone 42 and a stripping zone 43, reboiler 44 being provided to supply the necessary heat for the distillation. An overhead product comprising butane and toluene is withdrawn through line 45, while bottoms, comprising charge saturates, together with about 2% toluene, passes downwardly into stripping zone 43, in which it is contacted with butane in vapor phase, introduced through line 46. In passing through stripping zone 43, the butane will strip out substantially all of the toluene from the charge saturates, which latter will be recovered, essentially free of toluene, through line 47, for further processing as described in connection with Fig. 1. Butane and stripped toluene will pass upwardly through distillation zone 41, and will be recovered through line 45 along with the butane and toluene distilled overhead in distillation zone 41.

The second portion of the effluent from adsorber case 8, comprising charge aromatics, butane, and toluene, is diverted through valve 11 and line 48 to column 49, which is divided into an upper distillation zone 50, and a lower stripping zone 51, reboiler 52 being provided to supply heat for the distillation. An overhead product comprising butane and toluene is recovered through line 53, while bottoms, comprising charge aromatics, together with about 2% toluene, passes downwardly into stripping zone 51, in which it is contacted with butane in vapor phase introduced through line 54. The butane so introduced, together with toluene stripped from the charge aromatics, will pass upwardly through distillation zone 50, and will be recovered, along with distillation products, through line 53, while charge aromatics, essentially free of toluene, are recovered through line 55.

The products in lines 45 and 53 are then combined and passed to condenser 56, and thence to fractionating column 57 in which a portion of the butane content of the combined products is vaporized and taken overhead through line 58. A portion of the overhead butane, sufficient to dilute the fresh charge stock to the desired viscosity, is passed to diluent recycle line 2, and thence to charge stock line 1, where it is condensed by contact with the charge stock, giving up sufficient heat to the charge stock to raise it to a temperature high enough to permit removal of gel poisons in guard case 4. In the event that the heat content of this butane stream is such that condensation of all of it in the charge stock would raise the latter to an undesirably high temperature, a portion of the stream may be by-passed to condenser 2a, and therein condensed or cooled prior to recycle to admixture with the charge stock. A second portion of the overhead butane is diverted to manifold 59, which connects with butane inlet lines 46 and 54, to supply stripping medium to stripping zones 43 and 51. A bottoms product comprising butane and toluene in proportions approximating those desired for the desorbent is removed from column 57 through line 60 and is passed to desorbent storage 61, from which it is intermittently withdrawn through line 62 for passage through adsorber case 8. In order to make up for butane lost with the charge saturate and aromatic fractions, make-up butane may be admitted to diluent recycle line 2 through line 63, in order to maintain the desired saturate-aromatic balance in the desorbent.

It will thus be apparent to those skilled in the art that I have devised a process for the recovery of desorbent components from the products of an adsorption process which permits almost quantitative recovery of desorbent aromatics in condition for immediate recycling to the process, and that no outside facilities or materials such as drying means or absorption towers are necessary or desirable. As compared to prior processes for the recovery of such aromatics, the cost is very small, the only cost attributable to recovery being the very slight additional heat load required to vaporize the butane used as the stripping medium.

I claim:

1. In a cyclic adsorption process wherein a bed of adsorbent on which aromatic hydrocarbons are adsorbed in preference to saturated hydrocarbons is alternatively contacted with a hydrocarbon charge stock comprising aromatics and saturates boiling in the lubricating oil range in admixture with a lower boiling saturated hydrocarbon diluent, and with a desorbent comprising an aromatic hydrocarbon boiling below the boiling range of the charge stock in admixture with a further quantity of said diluent, the diluent boiling below the said desorbent aromatic component, and in which during each cycle the effluent from the adsorbent is collected in a first portion comprising charge saturates, diluent, and desorbent aromatics, and in a second portion comprising charge aromatics, diluent, and desorbent aromatics; the improvement which consists in subjecting each of said portions to fractional distillation, recovering from said fractional distillation a charge saturate fraction, a charge aromatics fraction, a vaporized diluent fraction, and a fraction comprising diluent and desorbent aromatics, said charge saturate fraction and charge aromatics fraction containing minor amounts of desorbent aromatics, separately contacting the charge saturate fraction and the charge aromatics fraction with a portion of said vaporized diluent fraction in an amount and at a temperature sufficient to substantially completely strip desorbent aromatics from the said fractions, and recovering a charge saturate fraction and a charge aromatics fraction essentially free of desorbent aromatics.

2. In a cyclic adsorption process wherein a bed of adsorbent on which aromatic hydrocarbons are adsorbed in preference to saturated hydrocarbons is alternatively contacted with a hydrocarbon charge stock comprising aromatics and saturates boiling in the lubricating oil range in admixture with a lower boiling saturated hydrocarbon diluent, and with a desorbent comprising an aromatic hydrocarbon boiling below the boiling range of the charge stock, in admixture with a further quantity of said diluent, the diluent boiling below the said desorbent aromatic component, and in which during each cycle the effluent from the adsorbent is collected in a first portion comprising charge saturates, diluent and desorbent aromatics, and in a second portion comprising charge aromatics, diluent and desorbent aromatics; the improvement which consists in subjecting the first effluent portion to a first fractional distillation, recovering vaporized diluent as an overhead product, recycling a first portion of the diluent so recovered to admixture with fresh charge stock, subjecting the bottoms from the first fractional distillation to a second fractional distillation, recovering an overhead fraction comprising diluent and desorbent aromatics, recovering and passing to a first stripping zone a bottoms fraction comprising charge saturates and a small amount of desorbent aromatics, contacting said bottoms fraction therein with a second portion of vaporized diluent recovered from the first fractional distillation in an amount and at a temperature sufficient to substantially completely strip desorbent aromatics from the charge saturates, recovering from the first stripping zone a product comprising charge saturates essentially free of desorbent aromatics; subjecting the second effluent portion to a third fractional distillation, recovering an overhead product comprising diluent and desorbent aromatics, recovering and passing to a second stripping zone a bottoms product comprising charge aromatics and a small amount of desorbent aromatics, contacting said bottoms product therein with a third portion of vaporized diluent recovered from the first fractional distillation in an amount and at a temperature sufficient to substantially completely strip desorbent aromatics from the charge aromatics, and recovering from said second stripping zone a product consisting essentially of charge aromatics.

3. In a cyclic adsorption process wherein a bed of adsorbent on which aromatic hydrocarbons are adsorbed in preference to saturated hydrocarbons is alternatively contacted with a hydrocarbon charge stock comprising aromatics and saturates boiling in the lubricating oil range in admixture with a lower boiling saturated hydrocarbon diluent, and with a desorbent comprising an aromatic hydrocarbon boiling below the boiling range of the charge stock, in admixture with a further quantity of said diluent, the diluent boiling below the said desorbent aromatic, and in which during each cycle the effluent from the adsorbent is collected in a first portion comprising charge saturates, diluent and desorbent aromatics, and in a second portion comprising charge aromatics, diluent, and desorbent aromatics; the improvement which comprises subjecting the first effluent portion to a first fractional distillation, recovering an overhead product comprising diluent and desorbent aromatics and a bottoms fraction comprising charge saturates and a small amount of desorbent aromatics, contacting, in a first stripping zone, said bottoms product with a gaseous stripping medium consisting of diluent recovered in a later step of the process, in an amount and at a temperature sufficient to substantially completely strip desorbent aromatics from said bottoms product, recovering a charge saturate fraction essentially free from desorbent aromatics; subjecting the second effluent portion to a second fractional distillation, recovering an overhead product comprising diluent and desorbent aromatics and a bottoms product comprising charge aromatics and a small amount of desorbent aromatics, contacting, in a second stripping zone, said bottoms product with a gaseous stripping medium consisting of diluent recovered in a later stage of the process, in an amount and at a temperature sufficient to substantially completely strip desorbent aromatics from said bottoms product, recovering a charge aromatics fraction essentially free from desorbent aromatics, combining the overhead products from the first and second fractional distillations and subjecting the combined products to a third fractional distillation, recovering a gaseous overhead product consisting of diluent, and passing a portion of said overhead product to each of said stripping zones to serve as stripping medium therein.

References Cited in the file of this patent

UNITED STATES PATENTS

| | | |
|---|---|---|
| 2,072,093 | Blakey | Mar. 2, 1937 |
| 2,095,863 | Freeman | Oct. 12, 1937 |
| 2,566,613 | Hepp | Sept. 4, 1951 |
| 2,628,933 | Eagle et al. | Feb. 17, 1953 |
| 2,716,144 | Olsen | Aug. 23, 1955 |